United States Patent
Kalbacher et al.

[11] Patent Number: 5,931,228
[45] Date of Patent: Aug. 3, 1999

[54] COOLING MODULE HAVING A MOUNTING PLATE WITH INTEGRAL ATTACHMENT SITES AND CHANNELS

[75] Inventors: Klaus Kalbacher, Rangendingen; Karl Schütterle, Walddorfhäslach; Winfrid Eckerskorn, Ottobrunn; Axel Temmesfeld, Raubling, all of Germany

[73] Assignees: Modine Mfg. Co., Racine, Wis.; Bayerische Motoren Werke, Munich, Germany

[21] Appl. No.: 09/010,286

[22] Filed: Jan. 21, 1998

[30] Foreign Application Priority Data

Jan. 23, 1997 [DE] Germany ............... 197 02 183

[51] Int. Cl.$^6$ ............... F28D 7/10
[52] U.S. Cl. ............... 165/916; 165/51; 165/140; 123/41.33; 123/196 AB
[58] Field of Search ............... 165/51, 916, 140; 123/41.48, 41.49, 196 AB

[56] References Cited

U.S. PATENT DOCUMENTS

| | | | |
|---|---|---|---|
| 1,560,694 | 11/1925 | Josephs, Jr. et al. | 165/51 |
| 2,008,164 | 7/1935 | Wolf | 165/51 |
| 2,013,708 | 9/1935 | Bianchi et al. | 165/51 |
| 2,859,016 | 11/1958 | Ephraim, Jr. et al. | 123/196 AB |
| 3,334,704 | 8/1967 | Gehrke et al. | 165/916 |
| 3,521,702 | 7/1970 | Holmes | 165/51 |
| 3,604,502 | 9/1971 | Morse | 165/51 |
| 3,614,982 | 10/1971 | Krizman | 165/51 |
| 3,616,874 | 11/1971 | Holmes | 165/51 |
| 4,063,431 | 12/1977 | Dankowski | 123/196 AB |
| 4,522,160 | 6/1985 | Speers et al. | |
| 4,531,574 | 7/1985 | Hoch | 165/916 |
| 4,774,911 | 10/1988 | Yamaguchi et al. | |

FOREIGN PATENT DOCUMENTS

| | | | |
|---|---|---|---|
| 3903199 | 4/1990 | Germany . | |
| 3916777 | 4/1990 | Germany . | |
| 4039490 | 6/1992 | Germany . | |
| 4136282 | 5/1993 | Germany . | |
| 4300577 | 7/1993 | Germany . | |
| 4365925 | 12/1992 | Japan . | |
| 5-71891 | 3/1993 | Japan | 165/140 |
| 5-215483 | 8/1993 | Japan | 165/140 |
| 5-215484 | 8/1993 | Japan | 165/140 |
| 2262600 | 6/1993 | United Kingdom | 165/140 |

*Primary Examiner*—Ira S. Lazarus
*Assistant Examiner*—Terrell McKinnon
*Attorney, Agent, or Firm*—Wood, Phillips, VanSanten, Clark & Mortimer

[57] ABSTRACT

According to a first aspect of the invention, a cooling module comprises a cooling system which comprises a radiator. A fan for generating air flow across the radiator also has a fan housing attached to the radiator in which the fan is located so that the fan is disposed relative to the radiator such that the fan may generate air flow across the radiator. A mounting plate is also attached to the radiator and has a first side facing the radiator and a second side. The mounting plate has attachment sites on the second side integral therewith on which other parts of the cooling system are mountable and channels integral therewith through which a coolant flowing through the cooling system may pass.

13 Claims, 4 Drawing Sheets

2
COOLING MODULE HAVING A MOUNTING PLATE WITH INTEGRAL ATTACHMENT SITES AND CHANNELS

FIELD OF THE INVENTION

The present invention is directed to a cooling module having a mounting plate attachable to a radiator, and, in particular, to a cooling module having a mounting plate attachable to a radiator with integral attachments sites and channels for a heat exchanger or a collection tank, for example.

BACKGROUND OF THE INVENTION

It is known in the art to have a cooling module, such as is used in a vehicle with an internal combustion engine, for example, with a radiator and a fan to generate air flow across the radiator. It is also conventional to mount the fan in a fan housing or shroud which is attached to the radiator.

It is also known in the art to provide attachment sites on the fan housing to mount a heat exchanger other than the radiator. For example, German Laid Open Application No. 4,039,490 shows a cooling module having a radiator, a pair of side-by-side fans, and a single fan housing. A gap is provided between the radiator and the fan housing in which a condenser is disposed. The fan housing has support plates with adjustment pins to which the condenser is attached. A similar arrangement was suggested in German Patent No. 4,244,039, but with an intermediate oil cooler rather than a condenser.

These modules may have several drawbacks. For one thing, the positioning of the other heat exchanger between the radiator and the fans may attenuate air flow through the radiator, thereby degrading the performance of the radiator. Additionally, the mounting of the condenser between the radiator and the fans increases the depth of the module, which is generally undesirable because the space within the engine compartment of a vehicle is limited.

Alternatively, the other heat exchanger may be attached directly to the vehicle separately from the cooling module, the other heat exchanger being connected to the radiator by hoses if the same coolant is used. This arrangement allows the dimensions of the cooling module to be minimized, and may provide for increased air flow through the radiator as opposed to the modules described above.

However, such cooling modules may also have drawbacks. By attaching the other heat exchanger directly to the vehicle separate and apart from the cooling module, the costs of installing the cooling system in the vehicle may be greater than in those modules wherein the cooling system is assembled as a single, unitary module. In addition, the additional hose required to connect the other heat exchanger to the radiator may use up considerable amounts of the limited space available within the engine compartment.

It should also be noted that it is known in the art to mount other electrical parts of the cooling system to the fan housing. For example, German Patent No. 3,903,199 discloses that a signal emitter which is part of an electric control circuit for the cooling system may be attached to the fan housing.

SUMMARY OF THE INVENTION

According to a first aspect of the invention, a cooling module is provided with a cooling system having a radiator. A fan is also provided for generating air flow across the radiator. A fan housing is attached to the radiator, in which housing the fan is located so that the fan is disposed relative to the radiator such that the fan may generate air flow across the radiator. A mounting plate is also attached to the radiator and has a first side facing the radiator and a second side. The mounting plate has attachment sites on the second side integral therewith on which other parts of the cooling system are mountable, and channels integral therewith through which a coolant flowing through the cooling system may pass.

Moreover, the mounting plate may have a connection tube on the first side integral therewith, the connection tube in fluid communication with the channels and the radiator such that a coolant flowing through the cooling system may flow through the channels, the connection tube and the radiator.

In a preferred embodiment, the radiator may have an opening therein in which the connection tube is disposed so that the connection tube is in fluid communication with the radiator.

In another embodiment, the mounting plate may have a base and a cover, the channels defined by first and second facing surfaces of the base and the cover respectively with the cover secured to the base.

Furthermore, the connection tube may be integral with the base.

Additionally, the other parts of the cooling system may include a heat exchanger with an inlet and an outlet. The heat exchanger is attached to the mounting plate with the inlet and outlet of the heat exchanger in fluid communication with the channels such that a coolant flowing through the heat exchanger may flow through the inlet and the outlet, the channels and the connection tube between the radiator and the heat exchanger.

In a preferred embodiment, the cover of the mounting plate may have first and second ports therethrough in fluid communication with the channels. The inlet and the outlet of the heat exchanger may be in fluid communication with the first and second ports such that the heat exchanger is in fluid communication with the channels.

In an even more preferred embodiment, the heat exchanger may have first and second connection tubes which define the inlet and the outlet, and the first and second tubes may be disposed in the first and second ports.

Further, a first O-ring may be disposed between the first port and the first tube and a second O-ring may be disposed between the second port and the second tube such that the first and second ports and the first and second tubes are in sealing relationship to each other.

Moreover, the fan housing and the mounting plate may sealingly abut each other to form a single, unitary assembly which is attached to the radiator.

Alternatively, the fan housing may be formed integrally with the mounting plate to form a single, unitary assembly which is attached to the radiator.

In a preferred embodiment, the mounting plate may have intersecting ribs to strengthen and rigidify the mounting plate.

In another embodiment, the other parts of the cooling system may include a collection tank and a valve unit to control the flow of a coolant flowing through the collection tank. The collection tank and the valve unit may be attached to the attachment sites on the mounting plate.

DETAILED DESCRIPTION OF THE PREFERRED EMBODIMENT

Figure 1:
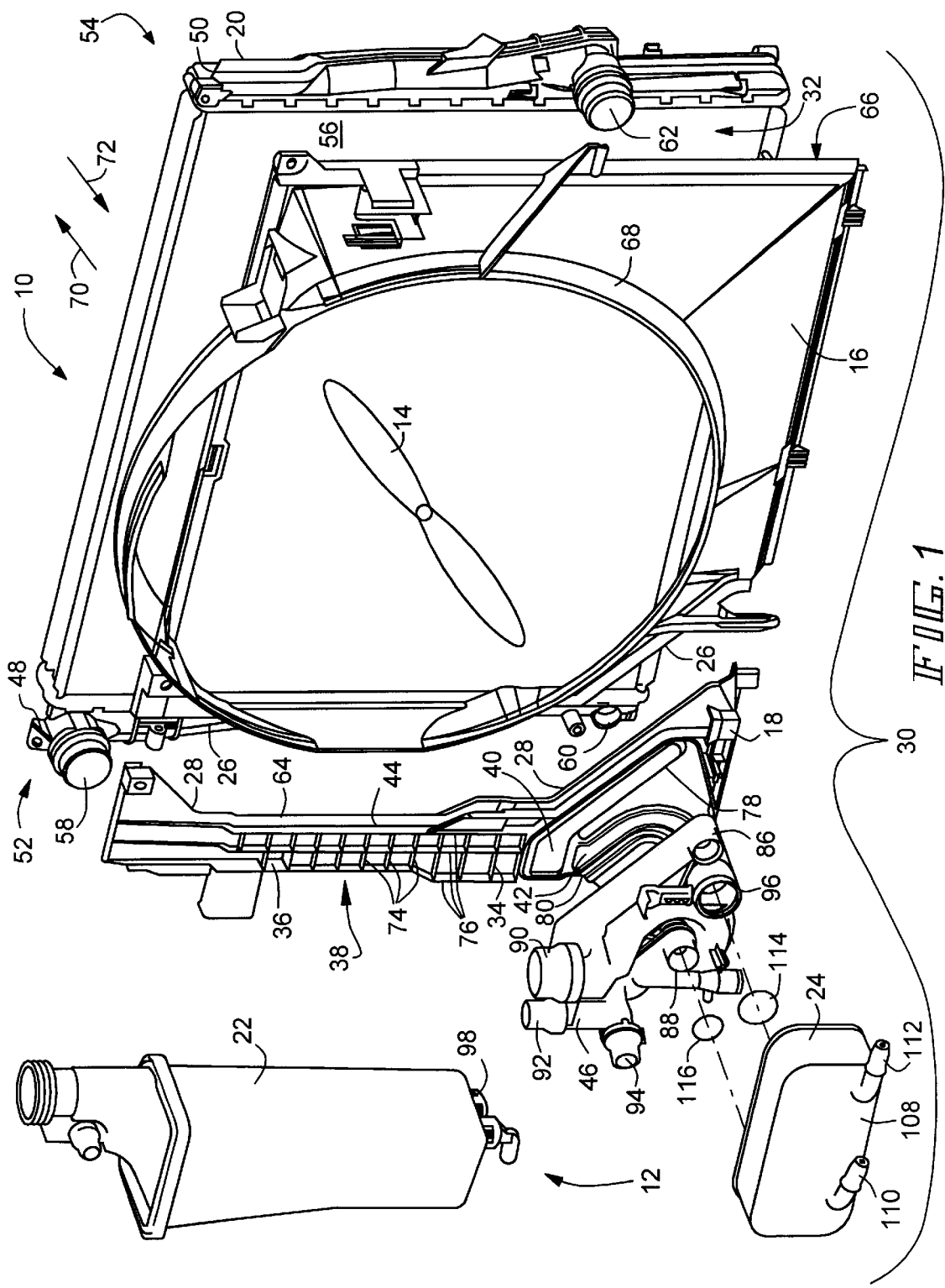
FIG. 1 is an exploded, perspective view of a cooling module according to the present invention, the cooling module including a cooling system (with a radiator, a heat exchanger, and a collection tank), a fan, a fan housing and a mounting plate.

FIG. 1 shows a cooling module 10 according to the present invention. The cooling module 10 shown is preferably for use with an internal combustion engine, most preferably for use with an internal combustion engine which is mounted on a vehicle.

The cooling module 10 includes a cooling system 12, a fan 14, a fan housing 16, and a mounting plate 18. The cooling system 12 shown in FIG. 1, in turn, includes a radiator 20, a collection tank 22, and a heat exchanger 24, such as a housingless oil/water heat exchanger for use as an oil cooler for an automatic transmission.

As assembled, the fan housing 16 and the mounting plate 18 are preferably sealingly joined together along an edge 26 of the fan housing 16 and an edge 28 of the mounting plate 18 so as to form a unitary housing assembly 30. The housing assembly 30 is then secured, by fasteners, for example, to the radiator 20. With the housing assembly 30 thus secured to the radiator 20, the fan 14 is disposed and maintained between the housing assembly 30 and a first surface 32 of the radiator 20.

The mounting plate 18 has a number of attachment sites 34, 36 on a surface 38 of the mounting plate 18 which faces away from the surface 32, i.e., away from the radiator 20. These attachment sites 34, 36 are provided so that elements of the cooling system 12, such as the collection tank 22, may be secured thereto. While the mounting plate 18 is shown located to the left of the fan 14 in FIG. 1, the mounting plate 18 and accompanying attachment sites may be located at the top, bottom or right of the fan 14. Furthermore, the fan housing 16 may also have attachment sites defined thereon.

The mounting plate 18 also has a number of channels 40, 42 formed preferably integrally with the mounting plate 18. In particular, the channels 40, 42 are defined in part by a base 44 and in part by a cover 46 of the mounting plate 18. Corresponding facing surfaces of the base 44 and the cover 46 define the channels 40, 42. The channels 40, 42 are provided for a coolant flowing in the cooling system 12, and in particular in the heat exchanger 24, to flow therethrough from the radiator 20 and/or the collection tank 22, which are also preferably in fluid communication with the channels 40, 42.

By providing the mounting plate 18 with the attachment sites 34, 36 and channels 40, 42, the cooling module 10 may be configured to accept a variety of different configurations of cooling system 12 while using only single mounting plate configuration. Moreover, the position of the attachment sites 34, 36 relative to the radiator may prevent the elements of the cooling system 12 from obstructing the flow of air through the radiator 20. Additionally, by providing channels 42, 44 formed in the mounting plate 18, the size of the cooling module 10 may be minimized through the elimination of the bulky connection hoses which are conventionally used to connect elements of the cooling system 12, such as the heat exchanger 24, to the radiator 20.

Figure 2:
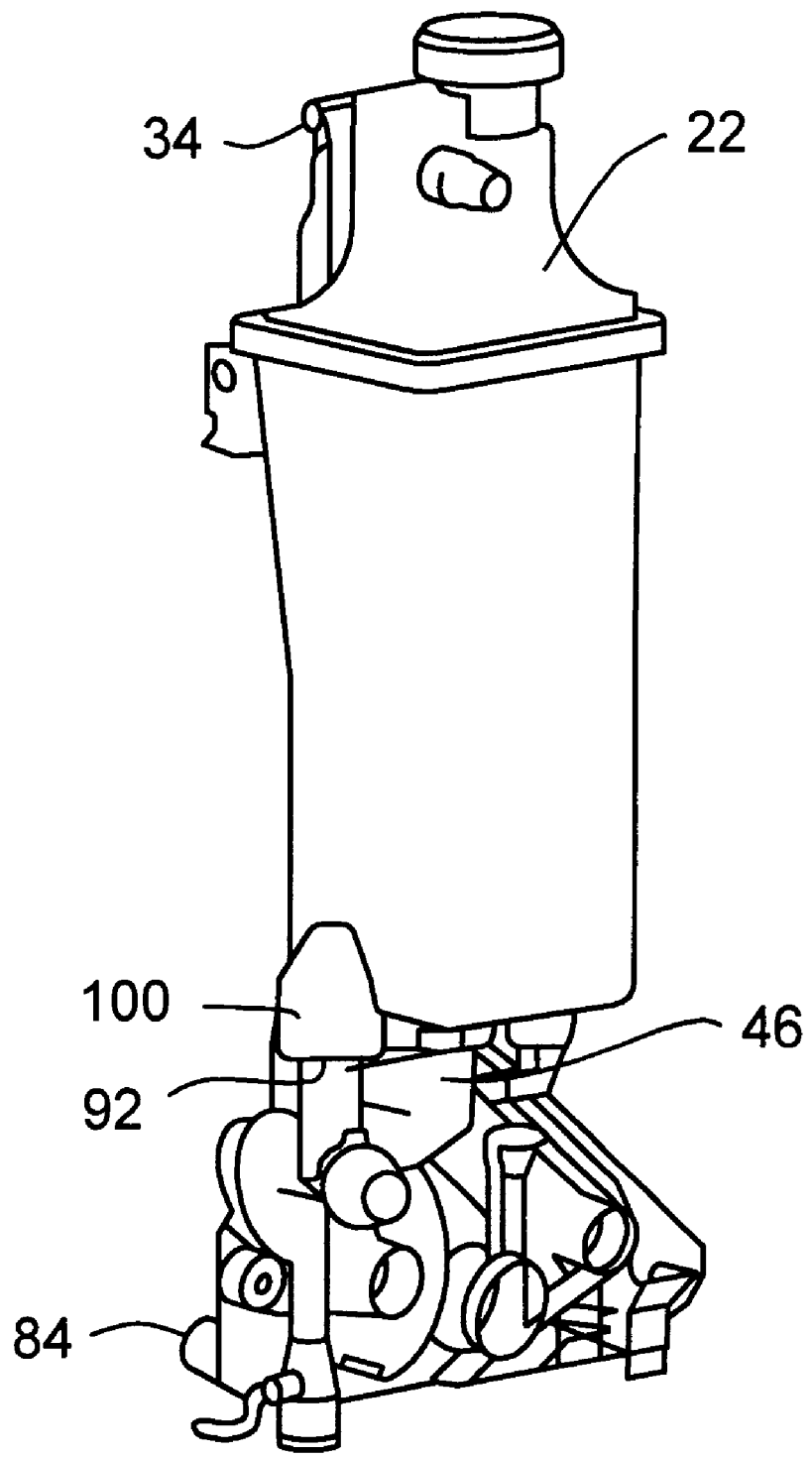
FIG. 2 is a reduced, perspective view of the collection tank attached to the mounting plate of FIG. 1.
Figure 5:
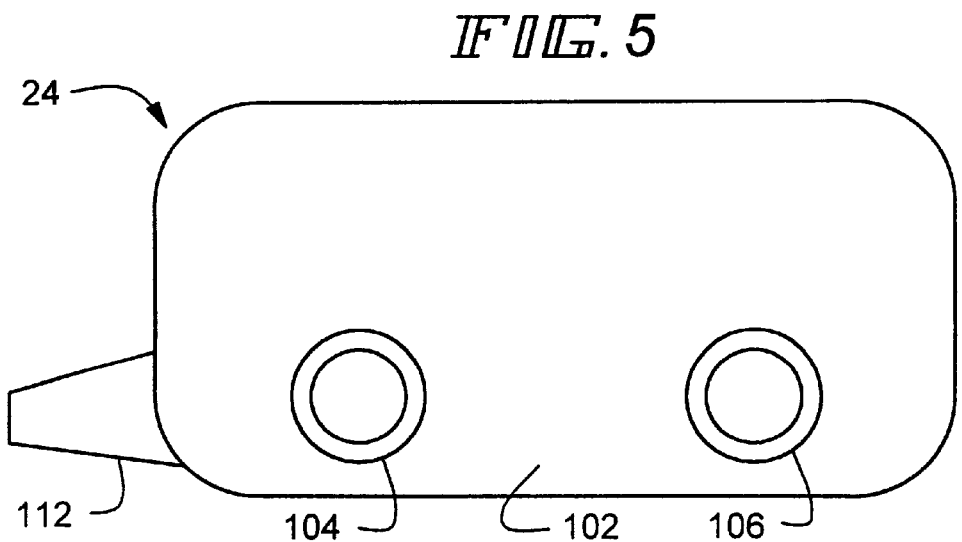
FIG. 5 is rear view of a heat exchanger shown in FIG. 1.

The structure and assembly of the cooling module 10 is now discussed in greater detail with respect to FIGS. 1, 2, and 5.

The radiator 20 may be of conventional single core construction as is shown, with first and second tanks 48, 50 disposed at opposite ends 52, 54 of a core 56 which is preferably made up of a plurality of tubes and fins, as is known in the art. The first tank 48 has first and second ports 58, 60, and the second tank has a single port 62. The first and second tanks 48, 50 are preferably made of plastic.

The first and second ports 58, 60 are connected to the first tank 48, which in turn is in fluid communication with the core 56. Similarly, the single port 62 is in fluid communication with the tank 50, which is also in fluid communication with the core 56.

As is known in the art, the radiator 20 may be configured to allow fluid to flow through the core 56 in a single pass or in multiple passes. For example, the tank 48 may have a baffle disposed therein between the first port 58 and the second port 60 to direct the coolant passing through the radiator 20 to flow in through the port 58 and out of the ports 60, 62. According to such a configuration, part of the coolant passing through the radiator 20 does so in a single pass (from the port 58 to the port 62), while part of the coolant passes through the radiator 20 in multiple passes (from the port 58 to the port 60).

In fact, as shown in FIG. 1, the radiator 20 is preferably configured so that a coolant entering the radiator 20 does so through the first port 58, passing therethrough into a portion of the first tank 48. The coolant then flows from the first tank 48 to the second tank 50 through the core 56. Some of the coolant then passes from the second tank 50 out of the radiator 20 through the port 62, while some of the coolant passes from the second tank 50 back through the core 56 to the first tank 48 and out of the second port 60.

Most preferably, the radiator 20 is constructed in accordance with the disclosure of U.S. patent application Ser. No. 08/882,127, which is hereby incorporated herein by reference. In accordance with the disclosure of the application, a plug can be disposed in the first tank 48 such that the coolant entering the first tank 48 through the port 58 may either: (1) pass substantially entirely through the length of the first tank 48 and the core 56 into the second tank 50 or (2) pass through a portion of the first tank 48, a first portion of the core 56, enter the second tank 50 and divide to pass through either the port 62 or a second portion of the core 56 and the second port 60.

Attached then to the radiator 20 is the unitary assembly 30 of the fan housing 16 and the mounting plate 18. The fan housing 16 and the mounting plate 18 have surfaces 64, 66 which face and overlie in part the surface 32 of the radiator 20. The surfaces 64, 66 prevent the ingress of air to flow through an opening 68 formed in the fan housing 16 when the unitary assembly 30 is attached to the radiator 20 except that which passes through the radiator 20.

As was indicated before, the fan 14 is mounted on the fan housing 16, and draws or forces air through the radiator 20. The fan 14 can be operated either to force air through the radiator in a first direction (shown by an arrow 70) or in a second direction (shown by an arrow 72). As mounted, the fan 14 would move the air across the radiator 20 in a cross-flow fashion, as is known in the art.

As was stated also above, the base 44 of the mounting plate 18 has attachment sites 34, 36 for the collection tank 22. To strengthen and rigidify the mounting plate 18 to better support the weight of the collection tank 22, the base 44 of the mounting plate has ribs 74, 76 formed on the surface 38. The ribs 74 and the ribs 76 intersect with each other, with the ribs 74 preferably disposed along a first direction and the ribs disposed along a second direction which is orthogonal to the first direction.

The base 44 also has raised walls 78, 80 which define in part the channels 40, 42. That is, the walls 78, 80 outline and define the portion of the channels 42, 44 abutting the base 44 of the mounting plate 18. Alternatively, the walls may be on the cover 46, or partially on the base 44 and partially on the cover 46.

Figure 3:
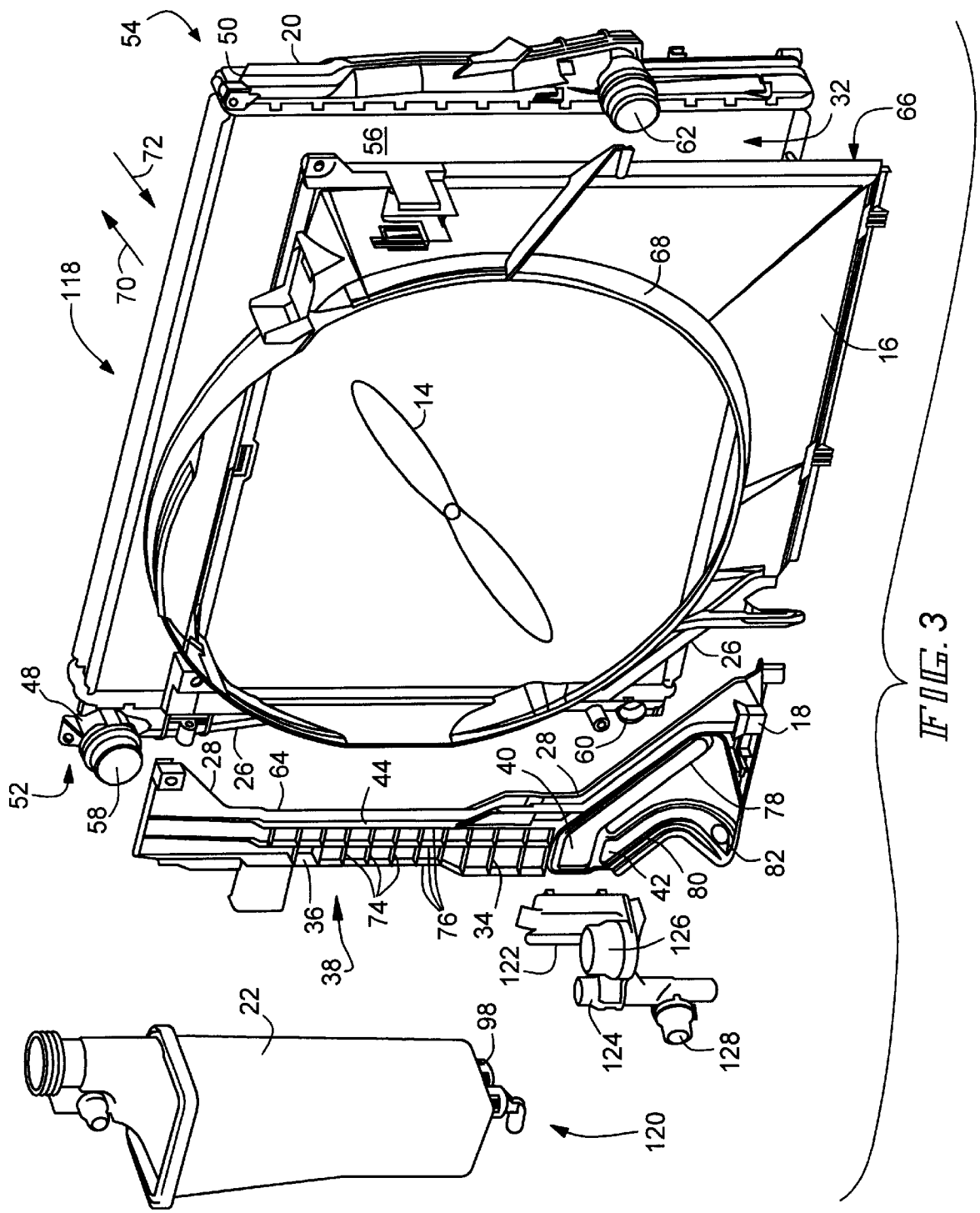
FIG. 3 is an exploded, perspective view of another cooling module according to the present invention, the cooling module including a cooling system (with a radiator and a collection tank), a fan, a fan housing and a mounting plate.

As can be seen more clearly with reference to FIGS. 2 and 3, the wall 80 also borders an opening 82 which is connected to and in fluid communication with a connection tube 84. The connection tube 84 can be disposed in the port 60 such that the channel 42, which is in fluid communication with the opening 82, is connected to and fluid communication with the port 60 of the radiator 20.

The cover 46, which is slipped on or preferably welded on to the base 44, has five ports 86, 88, 90, 92, 94 formed integrally therewith. The ports 86, 88, 90, 92, 94 are in fluid communication with the channels 40, 42.

The cover also has an attachment site 96 for the heat exchanger 24. Preferably, the heat exchanger 24 can be attached to the attachment site 96 with a conventional snap-fit fastener which is releasable such that the heat exchanger 24 can be removed from the attachment site 96.

The collection tank 22 can be attached to the cover 46 as is shown in FIG. 2. The collection tank 22 has a first port 98 and a second port 100. The first port 98 is in fluid communication with the port 90, while the second port 100 is in fluid communication with the port 92. Valves may be disposed between the ports 90, 98 and 92, 100 to control the flow of coolant therebetween. Most preferably, a valve (not shown) constructed in accordance with the disclosure of U.S. patent application Ser. No. 08/928,927, which is hereby incorporated herein by reference, is disposed between the ports 90, 98 to control the flow of coolant between the collection tank 22, the heat exchanger 24, and the radiator 20.

The heat exchanger 24 is connected to ports 86, 88 of the cover 46 so as to provide the shortest fluid path to the radiator 22. In particular, as seen in FIGS. 1 and 5, the heat exchanger 24 has a first side 102 with a first coolant inlet tube 104 and a first coolant outlet tube 106, and a second side 108 with an oil inlet tube 110 and an oil outlet tube 112. Preferably, the coolant inlet tube 104 is disposed into the port 86 with an O-ring 114 disposed therebetween, and the coolant outlet tube 106 is disposed in the port 88 with an O-ring 116 disposed therebetween. Additionally, bushings may be disposed between the inlet 104, the outlet 106 and the ports 86, 88.

With the heat exchanger 24 attached to the cover 46, the coolant can flow through the collection tank 22 and the heat exchanger 24 in a preheating mode, or the radiator 20 and the heat exchanger 24 in a cooling mode. Preferably, in accordance with patent application Ser. No. 08/928,927, the valve disposed between the ports 90, 98 controls the flow of the coolant between the radiator 20, the collection tank 22, and the heat exchanger 24 in accordance with temperature of the coolant in the cooling system 12.

In the preheating mode, heated coolant from the cooling system 12 collects in the collection tank 22. Over time, the heat of the coolant will activate the valve disposed between the ports 90, 98, causing heated coolant to flow from the collection tank 22 through the port 98 into the channel 40. At this time, the valve substantially prevents the flow of coolant between the channel 42 and the channel 40.

Coolant passing through the channel 40 enters the port 86, and from there enters the heat exchanger 24 through the coolant inlet 104. The heated coolant passes through the heat exchanger 24, whereby the oil passing from the oil inlet 110 to the oil outlet 112 is heated. The coolant passes from the heat exchanger 24 to the coolant outlet 106, and from there to the remainder of the cooling system 12 (not shown) through the port 94. At this point, coolant from the tank 22 may also flow through ports 92, 100 into the coolant stream.

After the preheating mode is completed, assuming that the engine remains on, the valve disposed between the ports 90, 98 will cause the flow of the coolant to shift from the collection tank 22 to the radiator 20, thereby assuming a cooling mode. That is, in the cooling mode, coolant enters the heat exchanger 24 from the radiator 20, rather than the collection tank 22.

In particular, coolant initially leaves the radiator 20 through the port 60 and passes into the connection tube 84. The coolant then passes through the passage 82 into the channel 42. The valve disposed between the ports 90, 98, permits the coolant entering the channel 42 to flow into the channel 40, while substantially preventing the coolant from the collection tank 22 from entering the channel 40.

The coolant in channel 40 then flows from the cover 46 into the coolant inlet 104. The coolant passes through the heat exchanger 24 and exits out of the coolant outlet 106 into the port 88. From the port 88, the coolant passes through the port 94 into the remainder of the cooling system 12 (not shown). At this point, coolant from the tank 22 may also flow through ports 92, 100 into the coolant stream.

Eventually, the coolant exiting the port 94 will flow into the port 58 of the radiator 20, through which it passes to be returned through passage 82 and the channels 42, 44 to the heat exchanger 24.

FIG. 3 shows a second cooling module 118, wherein elements which are common to both the cooling module 10 and the cooling module 118 are numbered in a similar fashion. The cooling module 118 differs from the cooling module 10 in that the cooling module 118 has a cooling system 120 without the heat exchanger 24. Such a cooling system could be used, for example, with a vehicle which has a manual transmission rather than an automatic transmission.

As the heat exchanger 24 is not present in the cooling module 118, the mounting plate 18 can be simplified, with the cover 46 being omitted entirely. Instead, a valve assembly 122 is included which is attached to the collection tank 22 and the mounting plate 18 at one of the attachment sites 34 of the mounting plate 18. The valve assembly has ports 124, 126, 128, of which ports 124, 126 are connected to the collection tank and port 128 is connected to the remainder of the cooling system 120. In this configuration, only the ports 124, 128 are operational, the port 126 being provided to plug or close the port 98 of the collection tank 22. Such an arrangement still limits the number and size of hoses necessary for use in the cooling system 120.

It should also be noted that in the cooling module 118, the port 60 must be closed to prevent leakage from the radiator 20 via the connection tube 84 and the passage 82. If the radiator 20 is constructed in accordance with the above-mentioned U.S. patent application Ser. No. 08/882,127, the port 60 can be closed simply by changing the plug which is inserted into the first tank 48. In doing so, all of the coolant entering the radiator 20 flows from port 58 to port 62 in a single pass.

Figure 4:
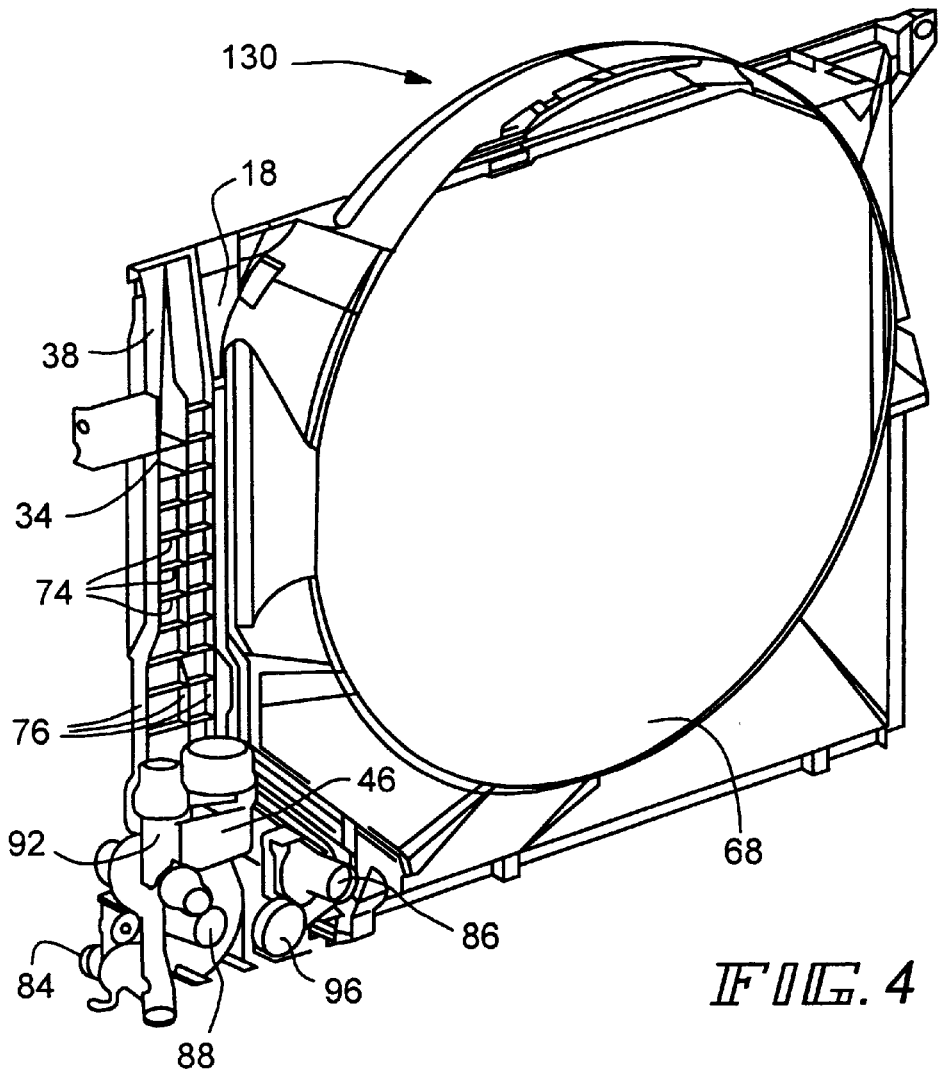
FIG. 4 is a perspective view of a fan housing and a mounting plate integral therewith for use in a cooling module according to the present invention.

FIG. 4 shows a modified unitary assembly 130 which can be used with either of the modules described above, but is shown specifically configured for use in the cooling module 10 (FIG. 1) with the cover 46 attached to the base 44 of the mounting plate 18. The modified unitary assembly 130 has the fan housing 16 and the mounting plate 18 formed integrally, such that the fan housing 16 is not separable from the mounting plate 18. While possibly more difficult to manufacture than the two-piece housing assembly 30 shown in FIGS. 1 and 3, the unitary assembly 130 has the advantages of needing fewer assembly steps and fasteners and eliminating the interface between the edges 26, 28 of the fan housing 16 and mounting plate 18, which may provide an alternate flow path for air passing through the cooling module.

Still other aspects, objects and advantages of the present invention can be obtained from a study of the specification, the drawings, and the appended claims.

We claim:

1. A cooling module comprising:

a cooling system comprising a radiator;

a fan for generating air flow across the radiator;

a fan housing attached to the radiator and in which the fan is located so that the fan is disposed relative to the radiator such that the fan may generate air flow across the radiator; and a mounting plate which is also attached to the radiator and has a first side facing the radiator and a second side, the mounting plate having attachment sites on the second side integral therewith on which other parts of the cooling system are mountable and channels integral therewith through which a coolant flowing through the cooling system may pass.

2. The cooling module according to claim 1, wherein the mounting plate has a connection tube on the first side integral therewith, the connection tube in fluid communication with the channels and the radiator such that a coolant flowing through the cooling system may flow through the channels, the connection tube and the radiator.

3. The cooling module according to claim 2, wherein the radiator has an opening therein in which the connection tube is disposed so that the connection tube is in fluid communication with the radiator.

4. The cooling module according to claim 2, wherein the mounting plate comprises a base and a cover, the channels defined by first and second facing surfaces of the base and the cover respectively with the cover secured to the base.

5. The cooling module according to claim 4, wherein the connection tube is integral with the base.

6. The cooling module according to claim 4, wherein:

the other parts of the cooling system comprise a heat exchanger with an inlet and an outlet, the heat exchanger attached to the mounting plate with the inlet and outlet of the heat exchanger in fluid communication the channels such that a coolant flowing through the heat exchanger may flow through the inlet and the outlet, the channels and the connection tube between the radiator and the heat exchanger.

7. The cooling module according to claim 6, wherein:

the cover of the mounting plate has first and second ports therethrough in fluid communication with the channels, the inlet and the outlet of the heat exchanger being in fluid communication with the first and second ports such that the heat exchanger is in fluid communication with the channels.

8. The cooling module according to claim 7, wherein:

the heat exchanger has first and second connection tubes which define the inlet and the outlet; and the first and second tubes being disposed in the first and second ports.

9. The cooling module according to claim 8, wherein a first O-ring is disposed between the first port and the first tube and a second O-ring is disposed between the second port and the second tube such that the first and second ports and the first and second tubes are in sealing relationship to each other.

10. The cooling module according to claim 2, wherein the fan housing and the mounting plate sealingly abut each other to form a single, unitary assembly which is attached to the radiator.

11. The cooling module according to claim 2, wherein the fan housing is formed integrally with the mounting plate to form a single, unitary assembly which is attached to the radiator.

12. The cooling module according to claim 2, wherein the mounting plate has intersecting ribs to strengthen and rigidify the mounting plate.

13. The cooling module according to claim 2, wherein:

the other parts of the cooling system comprise a collection tank and a valve unit to control the flow of a coolant flowing through the collection tank, and the collection tank and the valve unit are attached to the attachment sites on the mounting plate.

* * * * *